(12) United States Patent
Labuhn et al.

(10) Patent No.: US 9,014,941 B2
(45) Date of Patent: Apr. 21, 2015

(54) SYSTEM AND METHOD FOR VALIDATING ADAPTIVE CRUISE CONTROL OPERATIONS

(71) Applicant: GM Global Technology Operations LLC, Detroit, MI (US)

(72) Inventors: Pamela I. Labuhn, Shelby Township, MI (US); Patrick J. O'Leary, Clinton Township, MI (US); Barbara A. Shuler, Brighton, MI (US); James Heath Holbrook, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/173,886

(22) Filed: Feb. 6, 2014

(65) Prior Publication Data

US 2014/0172266 A1    Jun. 19, 2014

Related U.S. Application Data

(62) Division of application No. 12/370,415, filed on Feb. 12, 2009, now Pat. No. 8,452,513, and a division of application No. 13/873,047, filed on Apr. 29, 2013, now Pat. No. 8,762,023.

(51) Int. Cl.
| B60K 31/00 | (2006.01) |
| B60W 30/16 | (2012.01) |
| B60K 31/02 | (2006.01) |
| G01S 13/93 | (2006.01) |

(52) U.S. Cl.
CPC ............ *B60K 31/0008* (2013.01); *B60W 30/16* (2013.01); *G01S 2013/9321* (2013.01); *B60K 31/02* (2013.01)

(58) Field of Classification Search
CPC .... B60K 31/0008; B60K 31/02; B60W 30/16
USPC ...................................... 701/93, 96
See application file for complete search history.

(56) References Cited

U.S. PATENT DOCUMENTS

| 6,076,622 | A  | * | 6/2000 | Chakraborty et al. | ........ 180/169 |
| 6,374,173 | B1 | * | 4/2002 | Ehlbeck | ........................ 701/93 |
| 7,069,136 | B2 | * | 6/2006 | Assaf et al. | ..................... 701/93 |
| 7,433,774 | B2 | * | 10/2008 | Sen et al. | ...................... 701/102 |
| 7,526,373 | B2 | * | 4/2009 | Erhart et al. | .................... 701/51 |
| 2006/0223669 | A1 | * | 10/2006 | Thompson et al. | ........... 477/107 |

* cited by examiner

*Primary Examiner* — Kevin Hurley
(74) *Attorney, Agent, or Firm* — Ingrassia Fisher & Lorenz, P.C.

(57) ABSTRACT

A method of operating a vehicle comprising an adaptive cruise control system and an engine control module is provided. The engine control module is coupled to the adaptive cruise control system. The method comprises issuing a speed reduction signal from the adaptive cruise control system, verifying a speed reduction with a first sensor using the adaptive cruise control system, verifying the speed reduction with a second sensor using the engine control module, thereafter, receiving a resume signal from an operator input device, and executing a speed increase of the vehicle with the engine control module in response to receiving the resume signal with the engine control module.

7 Claims, 3 Drawing Sheets

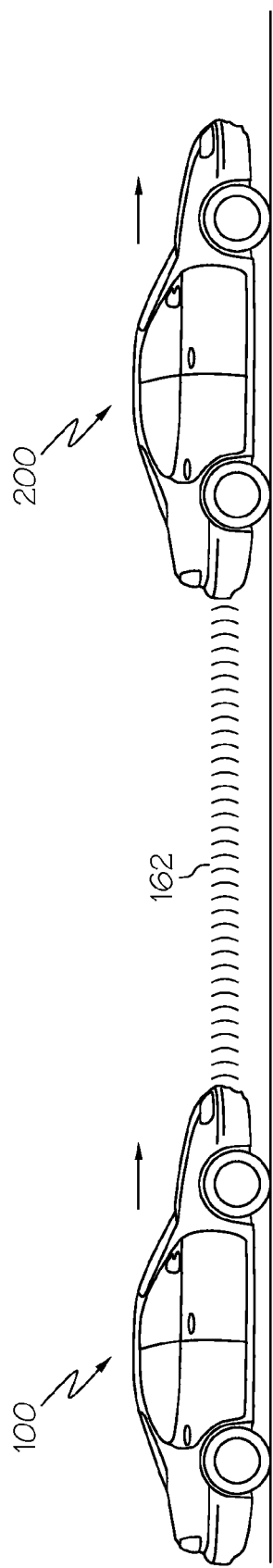
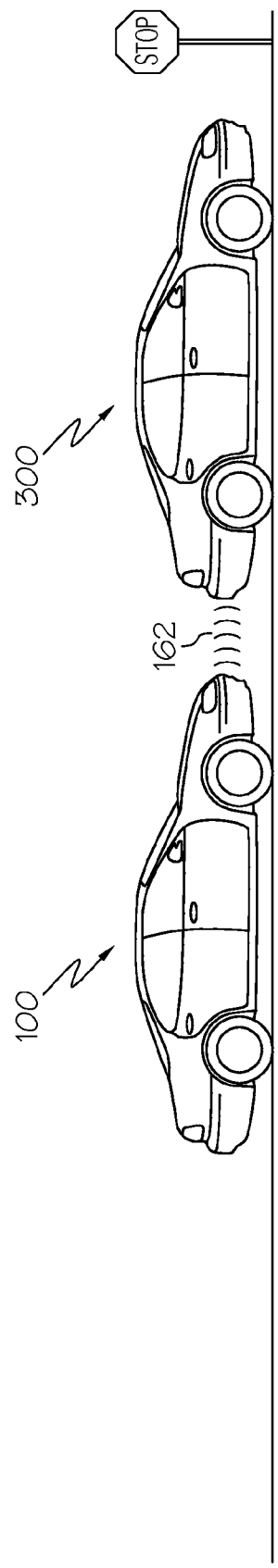

SYSTEM AND METHOD FOR VALIDATING ADAPTIVE CRUISE CONTROL OPERATIONS

RELATED APPLICATIONS

This application is a divisional application claiming priority pursuant to 35 U.S.C. §120 from co-owned application Ser. No. 12/370,415 filed Feb. 12, 2009 (now issued as U.S. Pat. No. 8,452,513), and co-pending, co-owned application Ser. No. 13/873,047 filed Apr. 29, 2013, which are incorporated herein in their entirety.

TECHNICAL FIELD

Embodiments of the subject matter described herein relate generally to cruise control systems for vehicles. More particularly, embodiments of the subject matter relate to systems and methods for validating operations and user input to adaptive cruise control systems.

BACKGROUND

Cruise control systems for vehicles have been widely used for convenient travel. Adaptive cruise control systems (ACCSs) improve some features over standard systems, such as adjusting the speed of the vehicle in response to changing traffic conditions. For example, a vehicle under the operation of an ACCS can monitor surrounding areas using range-finding techniques. Should the vehicle encounter a slow-moving vehicle in its lane, the ACCS can reduce the speed of the vehicle to prevent a collision, while continuing to operate the vehicle. Traditional cruise control systems would require the operator to disengage the cruise control system and resume manual operation of the vehicle.

Under certain driving conditions, an ACCS can bring the vehicle to a complete stop. When a complete stop occurs, it can be difficult for the ACCS to determine the circumstances of the stop. A complete stop could result from congested traffic, after which resumption of speed at a safe following distance would be an appropriate action for the system to undertake. A complete stop could also occur behind another vehicle at a stop sign. When the preceding vehicle advances through the intersection, the way would be clear for the vehicle to resume its cruising speed, which would be an undesirable result. Accordingly, a conventional ACCS is unable to operate the vehicle properly from a stop.

Additionally, an ACCS typically interacts with an electronic engine controller. Owing to the multiply-connected nature of the ACCS, with couplings to a variety of sensors and inputs, it is possible that the ACCS will reach a state wherein it has an incorrect record of the current operational state of the vehicle. For example, the ACCS could have received an incorrect signal indicating the vehicle is stopped from an improperly-functioning sensor, when in fact the vehicle is still moving. Thus, a conventional ACCS could transmit an inappropriate command signal following an incorrect sensor reading.

BRIEF SUMMARY

A method of operating a vehicle comprising an adaptive cruise control system and an engine control module is provided. The engine control module is coupled to the adaptive cruise control system. The method comprises issuing a speed reduction signal from the adaptive cruise control system, verifying a speed reduction with a first sensor using the adaptive cruise control system, verifying the speed reduction with a second sensor using the engine control module, thereafter, receiving a resume signal from an operator input device, and executing a speed increase of the vehicle with the engine control module in response to receiving the resume signal with the engine control module.

Another method of operating a vehicle comprising an adaptive cruise control system and an engine control module is provided. The engine control module is coupled to the adaptive cruise control system. The method comprises receiving a resume signal at the engine control module, the engine control module relaying the resume signal as a relayed resume signal to the adaptive cruise control system, receiving a speed increase signal at the engine control module, and executing a speed increase of the vehicle with the engine control module in response to the resume signal and the speed increase signal.

A vehicular control system is also provided. The system comprises an adaptive cruise control system and an engine control module. The adaptive cruise control system is adapted to engage an adaptive cruise control mode in response to receiving an engagement signal from an operator of the vehicle, transmit a speed reduction signal during the adaptive cruise control mode, verify speed reduction of the vehicle using a first sensor, the speed reduction of the vehicle being influenced by the speed reduction signal, receive a resume signal from the operator during the adaptive cruise control mode, and transmit a speed increase signal in response to receiving the resume signal. The engine control module is coupled to the adaptive cruise control system and adapted to receive the speed reduction signal, execute the speed reduction in response to receiving the speed reduction signal, verify the speed reduction using a second sensor, receive the resume signal, and execute a speed increase of the engine in response to receiving the resume signal and the speed increase signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a diagram showing a vehicle operated by an adaptive cruise control system in a first state;

FIG. 3 is a diagram showing the vehicle of FIG. 2 in a second state; and

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional components, and with reference to symbolic representations of operations, processing tasks, and functions. In practice, one or more processor-driven devices can carry out the described operations, tasks, and functions. It should be appreciated that the various block components shown in the figures may be realized by any number of hardware, software, and/or firmware components configured to perform the specified functions. For example, an embodiment of a system or a component may employ various integrated circuit components which may carry out a variety of functions under the control of one or more microprocessors or other control devices.

Figure 1:
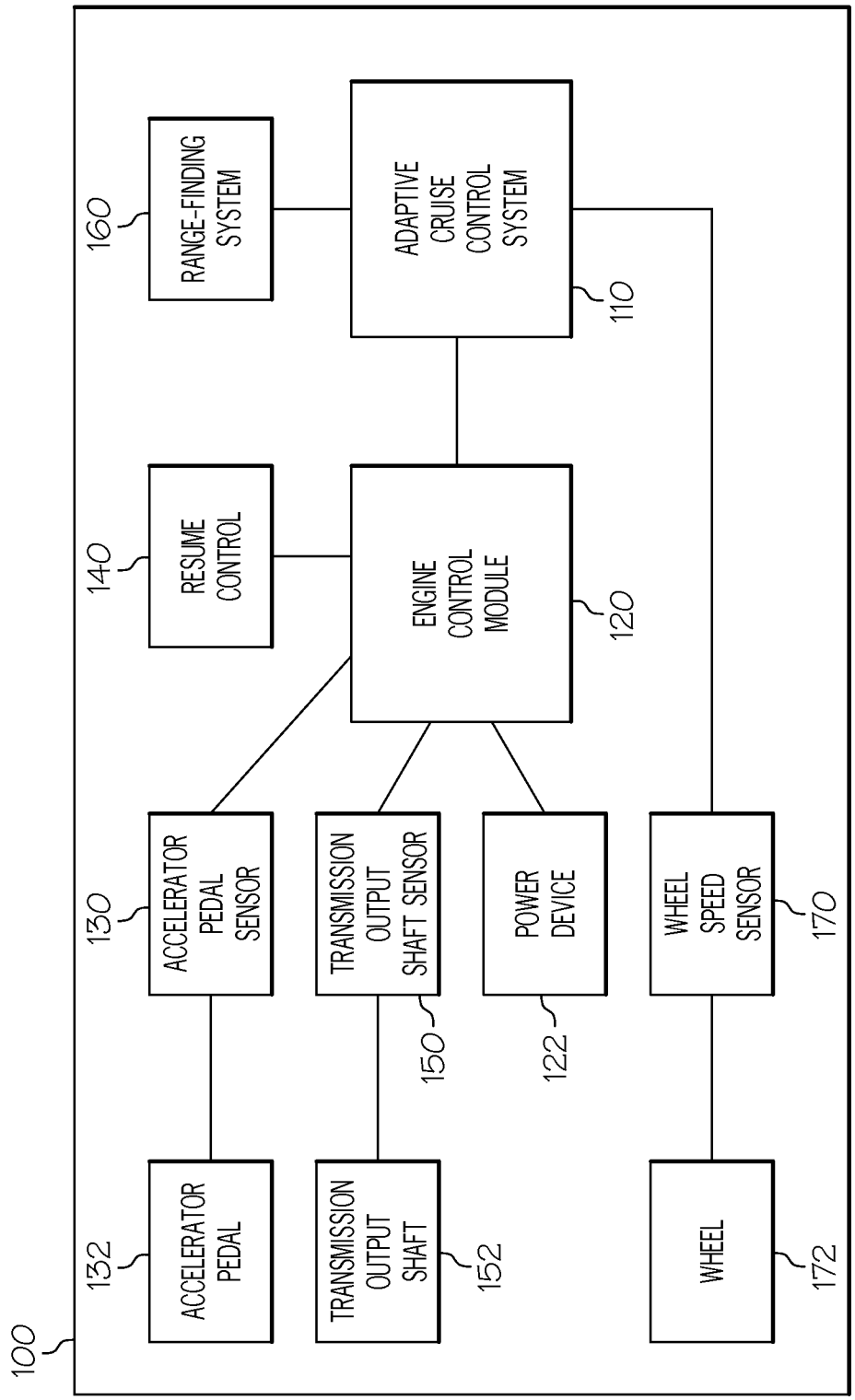
FIG. 1 is a schematic illustration of a vehicle with an adaptive cruise control system.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

In addition, certain terminology may also be used in the following description for the purpose of reference only, and thus are not intended to be limiting. For example, terms such as "first", "second", and other such numerical terms referring to structures do not imply a sequence or order unless clearly indicated by the context.

For the sake of brevity, the connecting lines shown in the various figures contained herein are intended to represent exemplary functional relationships and/or physical couplings between the various elements. It should be noted that many alternative or additional functional relationships or physical connections may be present in an embodiment of the subject matter.

FIG. 1 is a schematic of an embodiment of a vehicle 100 comprising an adaptive cruise control system (ACCS) 110. The vehicle 100 further comprises an engine control module (ECM) 120 coupled to the ACCS 110. The ECM 120 is preferably coupled to a power device 122. Various other input and output systems can be coupled to the ECM 120, including, among others, an accelerator pedal sensor 130 coupled to an accelerator pedal 132, a resume control 140 coupled to the ECM 120, and a transmission output shaft sensor (TOSS) 150 coupled to the transmission output shaft 152 of the vehicle 100. The ACCS 110 can also be coupled to a range-finding system 160 and a wheel speed sensor 170, the wheel speed sensor 170 coupled to a wheel 172 of the vehicle 100. Certain operations of the ACCS 110 can require input from multiple sources or validation by multiple components prior to execution. The use of multiple sources insures against executing operations in response to transient or errant signals received by the ACCS 110, extending its safe operation into previously challenging situations, as described below.

Although certain components are described as coupled, they are not exclusively coupled in all embodiments. For example, although the accelerator pedal sensor 130 is described and illustrated as coupled to the ECM 120, in other embodiments, the accelerator pedal sensor 130 can be coupled to the ACCS 110 as well. Such connections and/or couplings are omitted for clarity, and do not suggest that additional couplings and/or operational features are not contemplated. Rather, the accelerator pedal sensor 130 can, in some embodiments, be coupled to the ACCS 110 in addition to, or instead of, the ECM 120, and can provide signals to any coupled component, as appropriate for the embodiment.

The ACCS 110 is preferably an electronic component capable of performing functions typical of adaptive cruise control systems. The ACCS 110 is similar to traditional vehicular cruise control systems in some respects, such as the capability of maintaining the vehicle 100 at a relatively constant speed without operator input through the accelerator pedal 132. Additionally, through manipulation of certain input devices, the ACCS 110 can decrease or increase the cruising speed of the vehicle 100 without disengaging. The ACCS 110 can be engaged in response to receiving an engagement signal from an operator input device, such as a button or switch. The ACCS 110 can be disengaged after receiving a cancel or disengagement signal. Such signals can originate at any of various sources, such as a brake pedal of the vehicle 100, or a cancel button, part of the collection of input devices. The ECM 120 can additionally transmit signals to the ACCS 110 resulting in disengagement of the ACCS 110. Some of the operational features of the ACCS 110 are further described below.

The ACCS 110 is preferably controlled by the operator of the vehicle 100 through a collection of input devices, such as buttons, switches, or levers presented near other control input devices. In certain embodiments, the input devices can be integrated into other devices. Thus, a lever with one function of engaging or disengaging turn signals or blinkers on the vehicle 100 can additionally have a button or switch through which the ACCS 110 can be commanded. In certain embodiments, the interface devices through which the operator commands the ACCS 110 can be enabled or disabled through a master control switch.

One such operator input device is the resume control 140. The resume control 140 can be embodied by any of a variety of operator input mechanisms or devices employed as part of an ACCS interface assembly or cruise control command interface. Accordingly, the resume control 140 can be one of many cruise control command buttons, or any element of the assembly or interface. Such an assembly can include any desired number of buttons, switches, knobs, touch pads, soft-button controls, voice response devices, or other input devices.

Accordingly, the resume control 140 can be a single button, or combined with other functions on a single input device. When combined, the function performed by the ACCS 110 in response to operator manipulation can be based on the operational state of the ACCS 110 when the input is received. As one non-limiting example, a "resume" function can be combined with a function indicating "acceleration" and labeled "Resume/Accel" in some ACCS embodiments. When such a button is pressed, if the ACCS 110 is currently disengaged, it can attempt to re-engage control of the power device 122. Additionally, if the ACCS 110 is already engaged, the ACCS 110 can instead provide a command signal to the ECM 120 indicating a speed increase to a new cruising speed should be executed.

In certain embodiments, multiple buttons can be used, requiring simultaneous, substantially simultaneous, or sequential manipulation to result in the functional equivalent of the described resume control 140. In certain embodiments, the resume control 140 can be a single button or switch, but only perform the described functions in response to a pattern or sequence of manipulation, to prevent inadvertent activation. Therefore, although the resume control 140 is described in an isolated context with regard to certain functions of the embodiment of the vehicle 100, in other embodiments, the operative features of the resume control 140 can be embodied in different interface features.

The ECM 120 can be any type of electronic controller used in "drive-by-wire" equipped vehicles to receive input signals from the operator of the vehicle 100 and to command the power device 122 in response. For example, the accelerator pedal 132 can be an electronic input device without hydraulic or mechanical connection or coupling to the power device 122. Instead, the accelerator pedal sensor 130 can detect the position of the accelerator pedal 132 and the ECM 120 can operate the power device 122 in response. The ECM 120 can additionally receive information via signals from other sensors and input devices, including the TOSS 150, as appropriate.

The ECM 120 preferably operates the power device 122 in response to signals from the ACCS 110. Thus, where the ACCS 110 transmits a speed reduction or increase signal, the ECM 120 receives the signal and, as further described below, operates the power device 122 in response, decreasing or increasing the speed of the vehicle 100 as appropriate.

The ECM 120 can perform some or all of the described operations itself, or can cooperate with another controller of the vehicle 100. For example, the ECM 120 can receive sensor data directly, or in certain embodiments, a separate controller component can receive the sensor data and relay it to the ECM 120. Thus, while some computation and evaluation functions are described as being performed by the ECM 120, they also can be performed by a separate component, and the results provided to the ECM 120 for action to be taken, depending on the results. Accordingly, while computation and comparison steps or methods may be described in relation to the ECM 120, the ECM 120 can, in various embodiments, perform all, some, or none of the steps, while still performing operations in response to the computations or comparisons produced.

Additionally, the ECM 120 can be comprised of one or more processor-based devices, which may be physically integrated into a single component or circuit board. In certain embodiments, the ECM 120 can be distributed throughout the electronic and/or computing architecture of the vehicle 100, including integration with components performing additional functions.

The power device 122 is any type of power generating source sufficient to move the vehicle 100. Although described in the context of an internal combustion engine for an automobile, the system and techniques described herein can apply to other types of vehicles, including those employing different engine types. Some examples can include internal combustion engines, hybrid engines, an electric motor, a fuel cell, and so on. Thus, the power device 122 is not limited to vehicles with engines, but embodiments can include any type of vehicle with such a component providing the moving force.

The accelerator pedal 132 is preferably a pedal of any type suitable to permit the operator of the vehicle 100 to provide signals to the ECM 120 indicating a desired increase in speed of the vehicle 100. Accordingly, the accelerator pedal 132 can be of any type known in the art, and is described with regard to its functional features, and is not tied to a specific physical embodiment.

The accelerator pedal sensor 130 is preferably coupled to the accelerator pedal 132 for the purpose of detecting input from the operator via manipulation of the accelerator pedal 132. Thus, the accelerator pedal sensor 130 can detect pressure applied to the accelerator pedal 132, as well as the position of the accelerator pedal 132 and its rate of travel, any or all of which can be used to determine the appropriate response to the operator's manipulation. For example, the accelerator pedal sensor 130 can detect the position of the accelerator pedal 132 for purposes of determining the level of acceleration of the vehicle desired by the operator. Alternatively or additionally, the accelerator pedal sensor 130 can detect the rate of engagement of the accelerator pedal 132, which can be used to determine whether the operator desires a rapid or slow acceleration in response.

Thus, the accelerator pedal sensor 130 can be of any suitable type to perform the described operations, including multiple sensors where appropriate. Thus, a potentiometer, strain gauge, piezoelectric component, or any other type of sensor can be used as desired for the embodiment. Preferably, however, the type of sensor provides the information required for the ECM 120 to command the power device 122 responsively to the input. Signals from the accelerator pedal sensor 130 can be received by the ECM 120 for use in controlling the power device 122.

Where sensors are described, they are described functionally. The input object from which the quantity being measured is received is used descriptively in the name, and should be understood that this information is derived from signals generated by the sensor in response to its detecting functions, regardless of where they are processed to determine the detected quantity. A rotation sensor, for example, will be described for exemplary purposes. The rotation sensor can generate a voltage which varies according to the rotational rate of the inspected object. In some embodiments, the rotation sensor can provide the voltage to another system, such as the ECM 120, which will perform operations to determine the acceleration to which the voltage level corresponds. In other embodiments, the rotation sensor can perform the operations internally. In such embodiments, the rotation sensor will provide a signal indicating the rotational rate directly, instead of the voltage level. In certain embodiments, the rotation sensor can provide both the signal indicating rotational rate, as well as the voltage to other components. Thus, for sensors described throughout, the sensor can perform in any of these modes, as appropriate and/or desired for the embodiment.

The TOSS 150 is any sensor coupled to the transmission output shaft 152. The TOSS 150 is preferably capable of detecting the rotation rate of the transmission output shaft 152. From the information received from the TOSS 150, the ECM 120 can determine the speed of the vehicle 100. Other techniques for determining vehicle speed can also be used. The TOSS 150 can function by providing a voltage to the ECM 120 or by providing a signal indicating either the rotational rate of the transmission output shaft 152 or the speed of the vehicle 100 corresponding to the detected rotational rate, if configured for the embodiment. Other detection and reporting types are possible, as described above.

Similarly, the wheel speed sensor 170 can monitor the rotational rate of a wheel 172 of the vehicle 100. The wheel speed sensor 170 can transmit a signal indicating the rotational rate of the wheel 172, or wheel speed, or, in certain embodiments, provide the speed of the vehicle 100 as determined based upon the wheel speed. Thus, the wheel speed sensor 170 can be of any type described previously, and preferably performs the described functions, although the physical embodiment can vary between embodiments of the vehicle 100. In the illustrated embodiment, the wheel speed sensor 170 is coupled to the ACCS 110. In other embodiments, the wheel speed sensor 170 can be coupled to additional components, such as the ECM 120, as described above.

The range-finding system 160 is any remote detection system used by the vehicle 100 to monitor the surrounding environment. Thus, the range-finding system 160 can be a RADAR system, a LIDAR system, a near-field sensing system, a camera and video-recognition system, or any other type capable of performing the functions described.

Preferably, the range-finding system 160 can detect objects in front of the vehicle 100. Certain embodiments of the range-finding system 160 can detect objects to the sides and rear as well. Accordingly, although illustrated as a single component, the range-finding system 160 can sometimes comprises a variety of sub-components distributed throughout the vehicle 100 to perform the described functions.

In addition to detecting the presence of an object, the range-finding system 160 can preferably determine the speed of the object, either objectively or relative to the vehicle 100. Preferably the range-finding system 160 also can determine the distance between the vehicle 100 and the object. Together with the speed of the object relative to the vehicle 100, the system can then determine a time gap between the vehicle 100 and the object. The time gap is the amount of time between the rear of a travelling object ahead of the vehicle 100 and the front of the vehicle 100. Thus, a time gap of five seconds indicates that if the travelling object were to pass a particular position on the road, five seconds after the rear of the object 200 was at the position, the front of the vehicle 100 would reach the position. Additional description of operation of the ACCS 110 is provided with reference to FIGS. 2 and 3 below.

Certain embodiments of the range-finding system 160 can perform both sensing and calculation operations internally, while others can provide information and readings to other components of the vehicle 100, including the ACCS 110. In such embodiments, the ACCS 110, or other component(s) can perform operations to determine the time gap and other aspects of ranging information independently.

The ACCS 110 can be configured to monitor travel behind the preceding vehicle 200 either at a set distance or at a set time gap. Accordingly, information from the range-finding system 160 is preferably provided to the ACCS 110. In response, the ACCS 110 can transmit signals to the ECM 120, resulting in adjustment of the operation of the power device 122 to respond to changes in the driving environment caused by other vehicles, among other things.

Distance- or time-following are features of the ACCS 110 in addition to traditional cruise control system features. Through the use of such features, the vehicle 100 can be safely operated under changing driving conditions, unlike traditional systems. Examples of operation of the ACCS 110 are made with reference to FIGS. 2 and 3.

As shown in FIG. 2, the ACCS 110 can receive information from the range-finding system 160 indicating a preceding vehicle 200 is travelling in front of the vehicle 100. The preceding vehicle 200 may be travelling at a slower speed than the vehicle 100, resulting in the vehicle 100 approaching the preceding vehicle 200. While the vehicle 100 is operating at a cruising speed, the range-finding system 160 can transmit a wireless signal 162 periodically or continuously. With the wireless signal 162, the range-finding system 160 can detect the presence of the preceding vehicle 200, its distance from the front of the vehicle 100, and its speed and provide this information to the ACCS 110 as an alert signal. The alert signal can include information such as the fact of the existence of the preceding vehicle 200, its distance from the front of the vehicle 100, and its speed, and any other desired information, as described below. The range-finding system 160 can be configured to ignore objects beyond a certain distance or proximity threshold. The range-finding system 160 can be further configured to only transmit alert signals to the ACCS 110 for objects within the proximity threshold.

The ACCS 110 can reduce the speed of the vehicle 100 to prevent closely approaching the preceding vehicle 200. The ACCS 110 preferably transmits a speed decrease signal to the ECM 120, which can reduce the speed of the vehicle 100 through operation of the power device 122. Preferably, the speed of the vehicle 100 is adjusted to match or nearly match that of the preceding vehicle 200 while following at a safe distance. The following distance can be preconfigured or determined at a set time gap. The time gap specified can differ for different speeds, and the ACCS 110 can use different following techniques at different speeds. For example, a time gap of three seconds may be used for following the preceding vehicle 200 at 65 miles per hour, while a time gap of one second is used for following the preceding vehicle 200 at twenty miles per hour. In certain embodiments, the time gap can be constant, if desired. In some embodiments, the ACCS 110 can maintain a constant distance between the vehicle 100 and the preceding vehicle 200 at low speeds, while using a time gap following technique at higher speeds. Other embodiments can use different combinations of time gap and distance following techniques. The exact combination and/or parameters can be configured for each embodiment of the ACCS 110 as desired.

As shown in FIG. 3, the ACCS 110 can be configured to bring the vehicle 100 to a stop behind a stopped vehicle 300. The range-finding system 160 can transmit the wireless signal 162 to determine the speed and distance of the stopped vehicle 300. In this example, the stopped vehicle 300 has a speed of zero miles per hour. Accordingly, the ACCS 110 can reduce the vehicle 100 to a stop as well, at a preconfigured distance behind the stopped vehicle 300. The range-finding system 160 can be used to monitor the distance between the front of the vehicle 100 and the rear of the stopped vehicle 300. The ACCS 110 can act on the alert signal from the range-finding system 160 to properly stop the vehicle 100 at the desired distance. Certain embodiments of the ACCS 110 can operate one or more braking system of the vehicle 100 to decrease the speed of the vehicle 100, in addition to any speed reduction caused by adjusting the operation of the power device 122.

Figure 4:
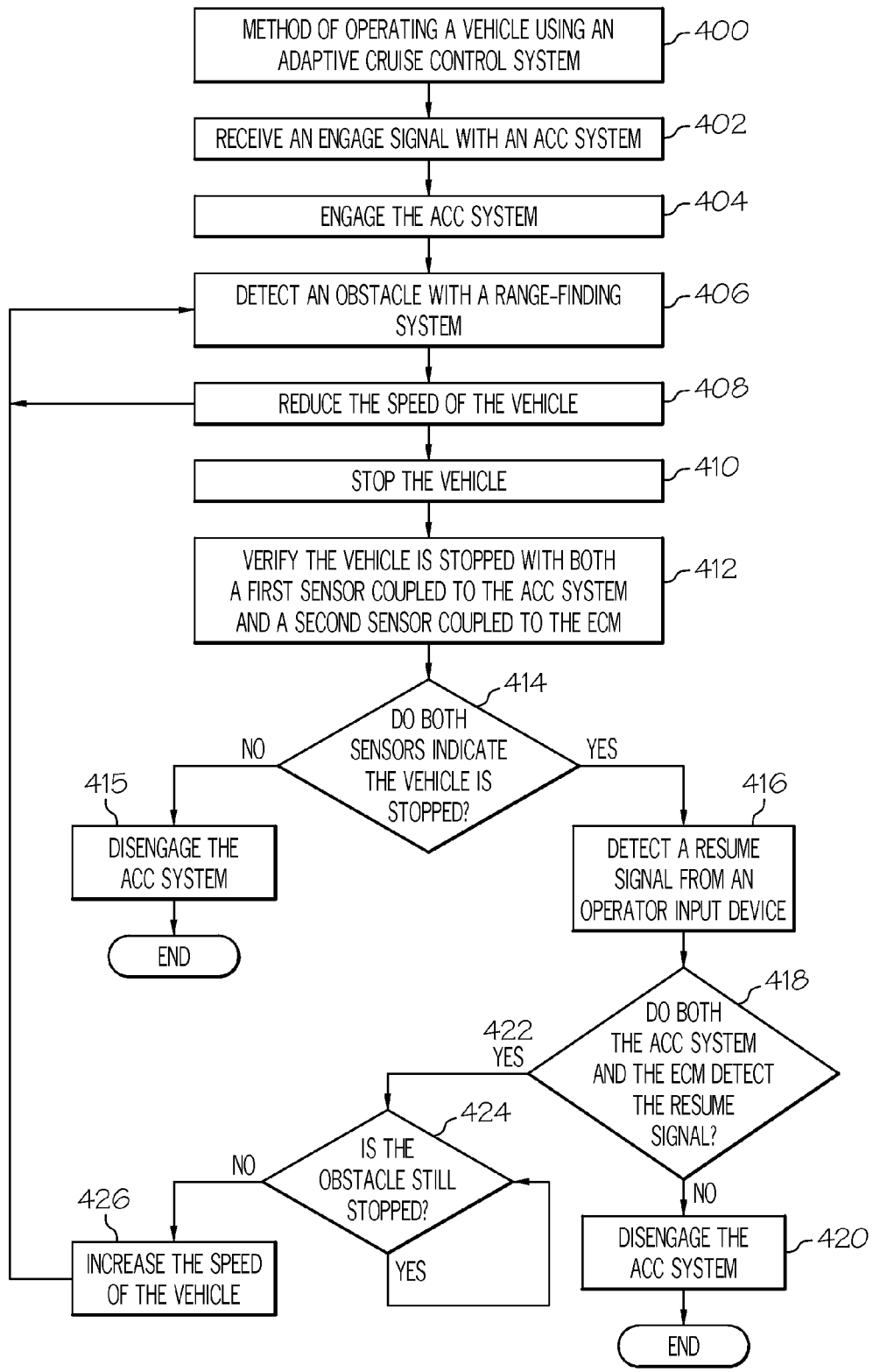
FIG. 4 is a schematic illustration of a method of operating a vehicle using an adaptive cruise control system.

The ACCS 110 can be configured to resume travel from such a stop. To resume travel at the appropriate time, however, operator input is required. With reference to FIG. 3, it would be inappropriate for the ACCS 110 to resume travel behind the stopped vehicle 300 when the stopped vehicle 300 increased speed. If such a simple instruction set were used, the vehicle 100 would travel through the stop sign 302 without stopping when the stopped vehicle 300 moved forward. This undesirable result can be avoided by resuming travel of the vehicle 100 only in response to operator input. FIG. 4 illustrates the steps of a method for operating a vehicle using an ACCS with such operator input.

The various tasks performed in connection with method 400 may be performed by software, hardware, firmware, or any combination thereof For illustrative purposes, the following description of method 400 may refer to elements mentioned above in connection with FIGS. 1-3. In practice, portions of method 400 may be performed by different elements of the described system, e.g., ACCS 110, ECM 120, power device 122, resume control 140, among others. It should be appreciated that method 400 may include any number of additional or alternative tasks, the tasks shown in FIG. 4 need not be performed in the illustrated order, and method 400 may be incorporated into a more comprehensive procedure or process having additional functionality not described in detail herein.

Operation of the ACCS 110 begins when the ACCS 110 receives an engage signal from the operator (task 402). In response, the ACCS 110 can become engaged (task 404), operating certain aspects of control of the vehicle 100, such as speed control. As with traditional cruise control systems, steering can remain under control of the operator. The ACCS 110 can be disengaged at any time through the techniques described above. During operation, the ACCS 110 can make use of information from the range-finding system 160 to monitor the space in front of the vehicle 100 for obstacles. When the ACCS 110 detects the presence of such an obstacle (task 406), it can transmit a speed decrease signal to the ECM 120. In response, the ECM 120 can reduce the speed of the vehicle (task 408). Under certain circumstances, this can be sufficient, and, as described above, the ACCS 110 can maintain a following distance behind the obstacle at the reduced speed. The range-finding system 160 can be used to monitor the distance and respond accordingly.

In some situations, however, the ACCS 110 will bring the vehicle 100 to a stop (task 410), such as behind the stopped vehicle 300. Prior to any other actions, including operator-initiated resumption of travel, that the travel of the vehicle 100 has been halted can be verified by two separate components (task 412). A first sensor, such as the wheel speed sensor 170 can provide speed information via a signal to the ACCS 110. Similarly, a second sensor, such as the TOSS 150, can provide speed information via a signal to the ECM 120. Other sensors coupled to either the ACCS 110 and/or ECM 120 can be used as well.

The ACCS 110 can exchange signals with the ECM 120, unilaterally receive a signal from the ECM 120, or unilaterally transmit a signal to the ECM 120 indicating the vehicle's speed as determined from the first sensor—here, the wheel speed sensor 170. The ECM 120 can transmit a signal to the ACCS 110 including the speed information obtained from the second sensor and/or receive information from the ACCS 110. Subsequently, the ECM 120 can compare the information received from the ACCS 110 with its own information to determine if both sensors independently provide information indicating the vehicle is stopped (task 414).

In the event that the two sensors each report a different speed for the vehicle 100, the ACCS 110 can be disengaged 415, returning the vehicle 100 to operator manual control. Small variations of measurement of speed between the sensors can be permitted, and configurable to the embodiment. For example, if the first sensor indicates the vehicle's speed at 0.0 miles per hour, while the second sensor indicates the vehicle's speed at 0.2 miles per hour, the information can be considered as the same by the ECM 120 if configured to permit at least 0.2 miles per hour variation between the readings. Nonetheless, where the vehicle's speed is not verified by two sensors within the preconfigured tolerance, the ACCS 110 is preferably disengaged (task 415).

If the two sensors verify that the vehicle is stopped, to resume travel under ACCS 110 operation, the operator must supply a resume signal. Preferably, the resume signal is verified by two components, including the ACCS 110 and ECM 120. In this way, the ACCS 110 will not inappropriately resume travel of the vehicle 100, and a single errant or anomalous signal will not be received as a valid resume signal.

Thus, a resume signal can be detected (task 416), such as manipulation of the resume control 140. A resume signal can originate at other sources, as well, if desired. One such example is detection of engagement of the accelerator pedal 132 by the accelerator pedal sensor 130. Other sources can be used, as described above. The resume signal is preferably received by the ECM 120 and ACCS 110. In certain embodiments, the resume control 140 can be coupled to both the ACCS 110 and ECM 120. In such embodiments, the signal can be received by the ACCS 110 directly. In some embodiments, however, the resume signal can be received solely by the ECM 120. In such embodiments, the ECM 120 can relay the resume signal as a relayed resume signal to the ACCS 110.

When a resume signal is received (task 416), the ACCS 110 and ECM 120 must both receive the resume signal prior to the ACCS 110 resuming operation (task 418). Thus, where the ACCS 110 alone receives a resume signal, it can respond by transmitting signals to the ECM 120 to resume travel, as described in greater detail below. The ECM 120 will not execute adjustments to the power device 122, including speed increases, based on signals from the ACCS 110 because it has not also received a resume signal. In such situations, the ACCS 110 can be disengaged (task 420) and manual control returned to the operator.

In certain embodiments, the ECM 120 can recognize a timed window in which to receive a resume signal after receiving signals from the ACCS 110 to resume acceleration. For example, where the ACCS 110 receives a first resume signal that, for whatever reason, is not simultaneously provided to the ECM 120, the ACCS 110 can send an acceleration signal to the ECM 120. Because the ECM 120 has not received the first resume signal also, it will not immediately begin acceleration. In some embodiments, however, the ECM 120 can monitor for a second resume signal within a preconfigured period of time. If the ECM 120 receives a second resume signal within the period of time, it can operate the power device 122 to accelerate. In this way, the operator can initiate resume signals more than once to resume travel without having to re-engage the ACCS 110 in the event one component fails to receive the first resume signal.

In those embodiments where the ECM 120 provides a relayed resume signal, signals from the ACCS 110 will be executed because the ECM 120 received the resume signal. In those embodiments where the resume signal is received by both the ACCS 110 and ECM 120, the ECM 120 will execute adjustments to the power device 122 in response to signals from the ACCS 110 because the ECM 120 previously received the resume signal. Multiple sequential stops and resumption of travel of the vehicle 100 can be thus executed, where the ACCS 110 and ECM 120 perform each set of steps after each stop of the vehicle.

In this way, the ECM 120 will not increase the speed of the vehicle 100 from a stopped position unless both the ACCS 110 and ECM 120 receive a resume signal or relayed resume signal. In the event that the resume signal is detected by both components (step 422), the vehicle 100 will still not resume travel unless the obstacle which caused the stop has moved. Thus, the ACCS 110 can rely on information from the range-finding system 160 to determine whether the obstacle is still stopped in front of the vehicle 100 (task 424). When the obstacle is still stopped, but the resume signal has been verified by two components, the ACCS 110 can wait until the obstacle has moved to resume travel. If the obstacle has moved, travel of the vehicle 100 can resume immediately (task 426). Subsequent to resuming travel, the ACCS 110 can continue to monitor the space in front of the vehicle 100 with the range-finding system 160 for obstacles and potential speed adjustments.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a vehicle comprising an adaptive cruise control system and an engine control module coupled to the adaptive cruise control system, the method comprising:
    receiving a resume signal at the engine control module;
    the engine control module relaying the resume signal as a relayed resume signal to the adaptive cruise control system;
    receiving a speed increase signal at the engine control module; and
    executing a speed increase of the vehicle with the engine control module in response to the resume signal and the speed increase signal.

2. The method of claim 1, wherein receiving the resume signal comprises receiving a signal from a cruise control command button.

3. The method of claim 1, wherein receiving the resume signal comprises receiving a signal from an accelerator pedal sensor.

4. The method of claim 1, further comprising:
    issuing a speed reduction command from the adaptive cruise control system;
    verifying a speed reduction of the vehicle using a first sensor coupled to the adaptive cruise control system and a second sensor coupled to the engine control module.

5. The method of claim 4, wherein verifying the speed reduction using the first sensor comprises receiving a speed signal from a wheel speed sensor coupled to the adaptive cruise control system.

6. The method of claim 4, wherein verifying the speed reduction using the second sensor comprises receiving a shaft speed signal from a transmission output shaft sensor coupled to the engine control module.

7. The method of claim 4, wherein the vehicle further comprises a range-finding system coupled to the adaptive cruise control system, and the method further comprises:
    detecting an obstacle in the path of the vehicle;
    transmitting an alert signal with the range-finding system in response to detecting the obstacle; and
    issuing the speed reduction command in response to receiving the alert signal from the range-finding system.

* * * * *